United States Patent
Sicard (10) Patent No.: US 8,514,530 B2
(45) Date of Patent: Aug. 20, 2013

(54) LOAD CONTROL AND PROTECTION SYSTEM

(75) Inventor: Thierry Sicard, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 236 days.

(21) Appl. No.: 13/096,320

(22) Filed: Apr. 28, 2011

(65) Prior Publication Data

US 2012/0275070 A1    Nov. 1, 2012

(51) Int. Cl.
*H02H 3/00* (2006.01)
*H02H 9/08* (2006.01)

(52) U.S. Cl.
USPC .......................................................... 361/42

(58) Field of Classification Search
USPC .......... 361/42, 1, 31, 91, 93.2, 126; 324/509, 324/539
See application file for complete search history.

(56) References Cited

U.S. PATENT DOCUMENTS

| 5,504,448 A | * | 4/1996 | Bennett et al. ............... 327/379 |
| 6,135,096 A | | 10/2000 | Bolz et al. |
| 2007/0103988 A1 | | 5/2007 | Bauer et al. |

* cited by examiner

*Primary Examiner* — Rexford Barnie
*Assistant Examiner* — Rasem Mourad
(74) *Attorney, Agent, or Firm* — Ingrassia Fisher & Lorenz, P.C.

(57) ABSTRACT

A control and protection system has a DC terminal (DCT), for connection to a DC bus (DCB), a load terminal (LT) for connection to a LOAD, a ground terminal (GT) for connection to an external ground bus (EGB), and an INPUT terminal for receiving ON/OFF commands. An internal ground bus (IGB) of the system is normally coupled to the EGB via the GT. But if a ground fault disconnects the GT from the EGB, the system automatically couples the IGB to the LT, thereby providing a synthetic ground that facilitates continued operation of the system and any peripheral circuits coupled between the DCB and the GT. Any peripheral circuit current passing through the system to the EGB is prevented from causing improper operation of the LOAD by automatically adjusting a series impedance that it passes through between the GT and the LT before reaching the LOAD and EGB.

17 Claims, 4 Drawing Sheets

LOAD CONTROL AND PROTECTION SYSTEM

FIELD OF THE INVENTION

This invention relates generally to systems and methods for controlling and protecting direct current (DC) loads from faults and improper connections.

BACKGROUND OF THE INVENTION

It is common in the electrical art to connect batteries to various types of loads using an electrical control system. Electrical motors are a non-limiting example of typical loads. There may be a potential hazard if the DC polarity is accidentally reversed or a ground connection to the motor controller is interrupted. Some systems include safety circuits as part of the controller. Such circuits are generally known as load control and protection systems.

BRIEF DESCRIPTION OF THE DRAWINGS

The invention will be better understood from a reading of the following detailed description, taken in conjunction with the accompanying figures in the drawings in which like numerals denote like or analogous elements, and wherein.

DETAILED DESCRIPTION OF THE INVENTION

For convenience of explanation it is assumed in the discussion that follows and the accompanying drawings that a negative ground direct current (DC) system is being used. Persons of skill in the art will understand that this is merely by way of example and not intended to be limiting and that positive ground DC systems may be used by appropriate exchange of polarity and device types. Accordingly, the embodiments of the invention described herein are intended to apply to both positive and negative ground arrangements. Further, while batteries are a common source of energy for such DC systems, any direct current (DC) source may be used.

Figure 1:
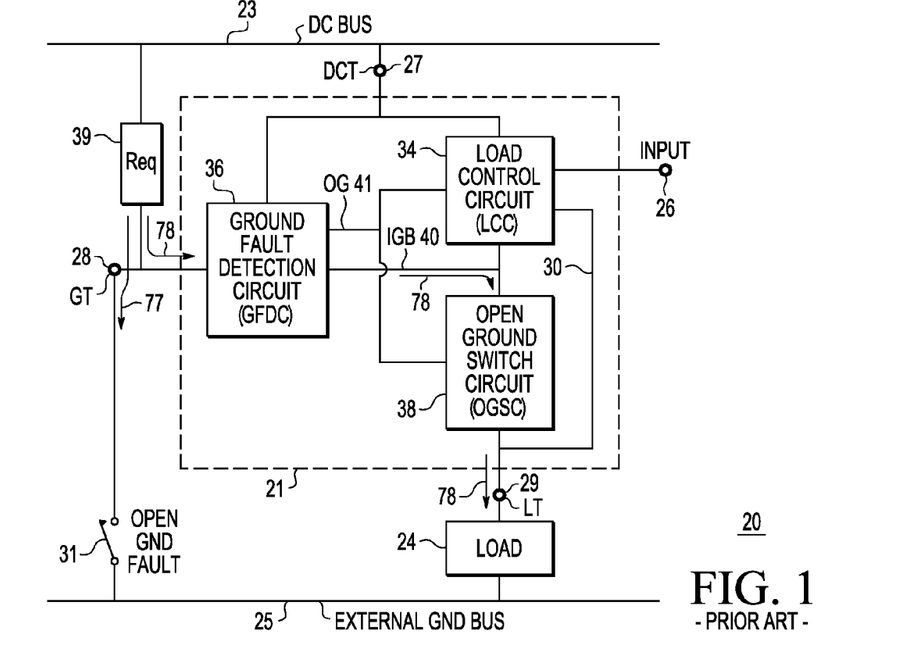
FIG. 1 shows a simplified system level block diagram of a load control and protection system connected between a direct current (DC) bus and a load, according to the prior art.

FIG. 1 shows simplified system level block diagram 20, according to the prior art, of load control and protection system 21 connected between direct current bus (DCB) 23 and LOAD 24. LOAD 24 is in turn connected to external ground bus (EGB) 25. Control and protection system 21 has external (e.g., ON/OFF) INPUT control terminal 26, direct current terminal (DCT) 27 adapted to be coupled to direct current (DCB) 23, ground terminal (GT) 28 adapted to be coupled to external ground bus (EGB) 25 and load terminal (LT) 29 adapted to be coupled to LOAD 24. Ground terminal (GT) 28 is shown as being coupled to EGB 25 via open ground fault simulation switch 31. Open ground fault switch 31 is not necessarily a distinguishable physical element, but is present in block diagram 20 to simulate the consequence of an accidental fault causing a break in what might otherwise be a normally fixed connection of ground terminal (GT) 28 to EGB 25.

Load control and protection system 21 comprises three principal subsystems: (i) load control circuit (LCC) 34 receiving e.g., ON/OFF signals from external INPUT terminal 26 and providing power to load terminal (LT) 29 via lead 30, (ii) ground fault detection circuit (GFDC) 36 coupled to ground terminal (GT) 28, and (iii) open ground switch circuit (OGSC) 38 coupled to load terminal (LT) 29. Load control circuit (LCC) 34 and ground fault detection circuit (GFDC) 36 are also coupled to direct current terminal (DCT) 27 adapted to be coupled to direct current bus (DCB) 23. Load control circuit (LCC) 34, ground fault detection circuit (GFDC) 36 and open ground switch circuit (OGSC) 38 are coupled to each other via internal ground bus (IGB) 40. Load control circuit (LCC) 34, ground fault detection circuit (GFDC) 36 and open ground switch circuit (OHSC) 38 are further coupled by open ground (OG) signal lead 41.

In normal operation, DCB 23 is positive and ground fault simulation switch 31 is closed. Under these circumstances, ground fault detection circuit (GFDC) 36 causes internal ground bus (IGB) 40 to be effectively connected to ground terminal (GT) 28 and external ground bus (EGB) 25, so that load terminal (LT) 29 and LOAD 24 can be energized by load control circuit (LCC) 34 from DC terminal (DCT) 27 and DC bus (DCB) 23 in response to (e.g., ON/OFF) signals on external INPUT 26. During reverse DC connection conditions when the polarity appearing on DC bus 23 is reversed (e.g., negative DC bus), ground fault detection circuit (GFDC) 36 causes internal ground bus (IGB) 40 to follow DC bus (DCB) 23 rather than external ground bus (EGB) 25. LCC 34 turns on so as to avoid being damaged if a heavy reverse current flows through LOAD 24.

If a ground fault has occurred (equivalent to ground fault simulation switch 31 being open), GFDC 36 senses the potential on GT 28 (e.g., lack of GND) and provides a signal on open ground (OG) lead 41 to OGSC 38 and LCC 34 indicating that an open ground condition exists. The signal on OG lead 41 to OGSC 38 causes OGSC 38 to couple IGB 40 to LT 29. Because LOAD 24 is usually of comparatively low impedance (e.g., often just a few tens of milli-Ohms), connecting IGB 40 to LT 29 provides a synthetic ground for system 21, so that the open ground condition does not cause load control circuit (LCC) 34 to malfunction and apply power to load terminal (LT) 29 and LOAD 24 when INPUT 26 is OFF. In this manner potentially hazardous conditions arising from reverse DC and/or open ground fault conditions are minimized or avoided.

While prior art system 21 of FIG. 1 is successful in dealing with both open ground fault conditions and/or reverse DC connection conditions in this manner, a potentially hazardous condition can occur if peripheral circuits 39 are also coupled between DCB 23 and GT 28, as is sometimes the situation. Resistance Req represents the equivalent resistance of such peripheral circuits 39 between DC bus (DCB) 23 and ground terminal (GT) 28. Peripheral circuits 39 may be of any type. Under normal conditions when no open ground fault exists (e.g., ground fault simulation switch 31 is closed), then peripheral current 77 arising from resistance Req of peripheral circuits 39 is harmlessly conducted through GT 28 to external ground bus (EGB) 25. However, if peripheral circuits 39 represented by resistance Req are present when an open ground fault condition occurs (i.e., ground fault simulation switch 31 is open), then peripheral current 77 through GT 28 to EGB 25 is blocked. When load control and protection system 21 couples GT 28 and IGB 40 to LT 29, peripheral current 78 from resistance Req can flow through GFDC 36 to IGB 40 and from IGB 40 through OGSC 38 to LT 29 and then through LOAD 24 to EGB 25. If peripheral current 78 becomes excessive, potentially unsafe operation of LOAD 24 could result. This is not desirable.

Figure 2:
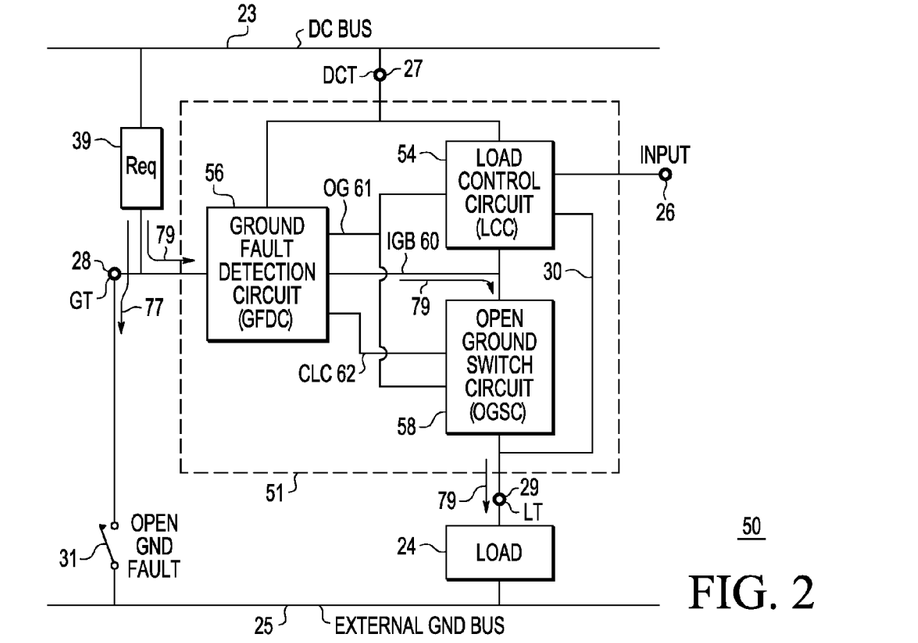
FIG. 2 shows a simplified system level block diagram of a load control and protection system connected between a DC bus and a load, according to an embodiment of the present invention.

FIG. 2 shows a simplified system level block diagram 50 of load control and protection system 51 connected between direct current bus (DCB) 23 and LOAD 24, according to an embodiment of the present invention in which excess LOAD current resulting from attachment of peripheral circuits 39 is limited. For convenience of description, the same reference numbers are used in FIG. 2 as in FIG. 1 for common elements and the descriptions thereof provided in connection with FIG. 1 are incorporated herein by reference. Load control and protection system 51 comprises three principal subsystems: (a) load control circuit (LCC) 54 (analogous to LCC 34 of FIG. 1) receiving e.g., ON/OFF signals from external INPUT terminal 26 and providing power to load terminal (LT) 29 vias link 30 in response thereto, (b) ground fault detection circuit (GFDC) 56 (analogous to GFDC 36 of FIG. 1) coupled to ground terminal (GT) 28, and (c) open ground switch circuit (OGSC) 58 (analogous to OGSC 38 of FIG. 1) coupled to load terminal (LT) 29. Load control circuit (LCC) 54 and ground fault detection circuit (GFDC) 56 are also coupled to direct current terminal (DCT) 27. Load control circuit (LCC) 54, ground fault detection circuit (GFDC) 56 and open ground switch circuit (OGSC) 58 are coupled to each other via internal ground bus (IGB) 60 analogous to IGB 40 of FIG. 1. Ground fault detection circuit (GFDC) 56, load control circuit (LCC) 54 and open ground switch circuit (OHSC) 58, are further coupled by open ground (OG) signal lead 61 analogous to OG signal lead 41 of FIG. 1. System 51 of FIG. 2 and system 21 of FIG. 1 operate in a generally similar manner with respect to reverse polarity and open ground fault conditions and the discussion thereof in connection with system 21 of FIG. 1 is incorporated herein by reference.

Control and protection system 51 of FIG. 2 differs from system 21 of FIG. 1 in that additional current limiting connection (CLC) 62 is provided between OGSC 58 and GFDC 56. It is assumed in FIG. 2 that peripheral circuits 39 represented by resistance Req are coupled between direct current bus (DCB) 23 and GT 28. When an open ground fault condition occurs (i.e., ground fault simulation switch 31 is open), then peripheral current 77 through GT 28 to EGB 25 is blocked. When load control and protection system 51 couples GT 28 and IGB 60 to LT 29 in response to the open ground fault, then current 79 from resistance Req (analogous to current 78 of FIG. 1) can flow through GFDC 56 to IGB 60 and from IGB 60 through OGSC 58 to LT 29 and then through LOAD 24 to EGB 25. However, the presence of CLC 62 makes it possible to limit the magnitude of peripheral current 79 passing through LOAD 24 to safe levels. Current 79 flowing from resistance Req of peripheral circuits 39 through GFDC 56, through IGB 60 and through OGSC 58 to LT 29 and thence to LOAD 24 is sensed in OGSC 58. Current limiting connection (CLC) 62 coupled to GFDC 56 is energized by this feedback signal. In response to CLC 62 being energized, GFDC 56 limits peripheral current 79 from resistance Req of peripheral circuits 39 flowing through GFDC 56, through IGB 60, through OGSC 58 to LT 29 and to LOAD 24. In this way the potential excess peripheral current condition noted in connection with FIG. 1 is limited and any unwanted activity in LOAD 24 that might arise from such excess peripheral current is avoided. This is a useful and important advance in the art.

Figure 3:
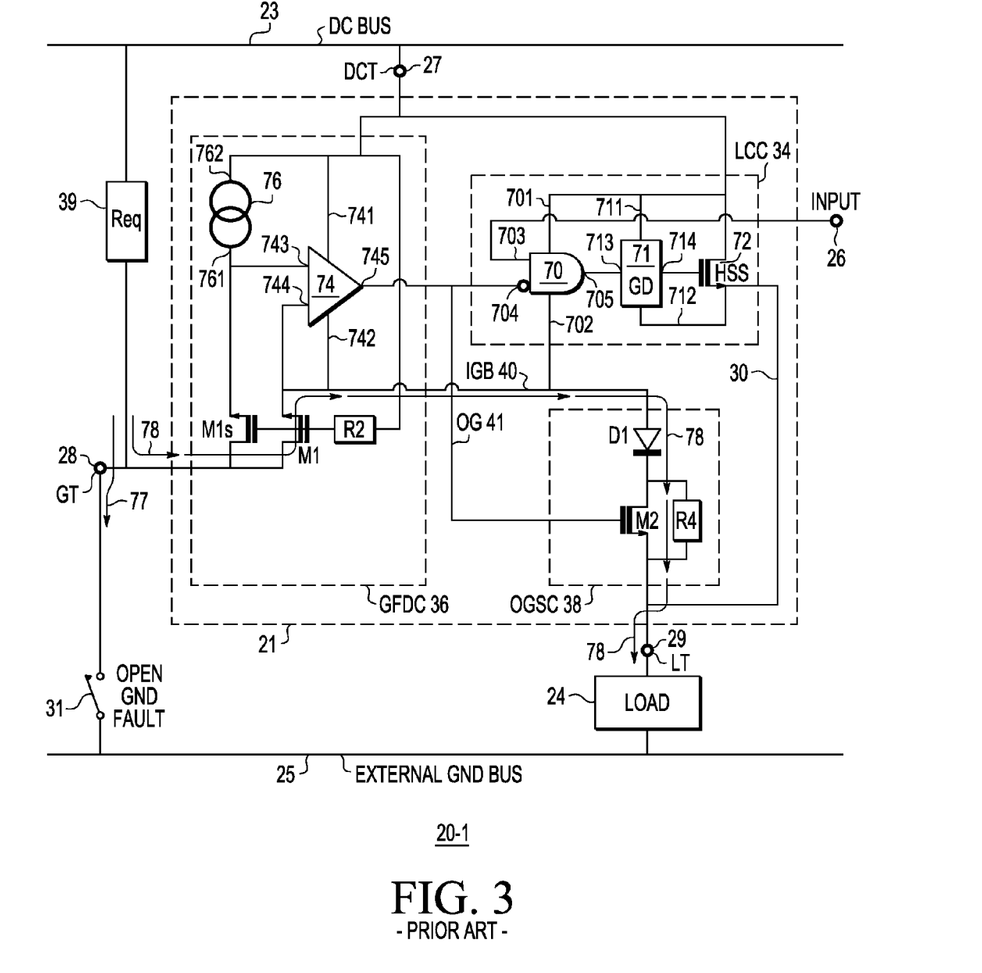
FIG. 3 is a simplified schematic of the load control and protection system of FIG. 1 illustrating further details according to the prior art.

FIG. 3 shows simplified schematic 20-1 of load control and protection system 21 of FIG. 1 illustrating further details according to the prior art. The same reference numbers are used in FIG. 3 as in FIG. 1 for common elements and the discussions thereof provided in connection with FIG. 1 are incorporated herein by reference. The circuit details of LCC 34, GFDC 36 and OGSC 38 comprising control and protection system 21 are described below.

LCC 34 comprises AND gate 70, gate driver (GD) 71 and high side switch (HSS) transistor 72. For convenience, HSS transistor 72 may also be referred to as HSS 72. DC power to AND gate 70 is provided by connection 701 to DCT 27 and connection 702 to internal ground bus (IGB) 40. Input 703 of AND gate 70 is coupled to external control signal INPUT terminal 26, wherein external ON/OFF signal commands are provided for the purpose of controlling the power delivered by system 21 to load 24 via lead 30 and LT 29. Input 704 of AND gate 70 is coupled to output 745 of comparator 74 of GFDC 36. The small circle at input 704 of AND gate 70 indicates that this input is inverted, that is, has a built-in or external input signal inverter so that a LOW output from comparator 74 becomes a HIGH input to AND gate 70. Output 705 of AND gate 70 is coupled to signal input 713 of gate driver (GD) 71. DC power to GD 71 is provided by lead 711 coupled to DCT 27 and lead 712 coupled to the source of HSS 72, which is in turn coupled via lead 30 to LT 29. Output 714 of GD 71 is coupled to the gate of HSS 72. GD 71 provides whatever signal level translation is needed to drive HSS 72 between OFF and ON states, depending upon the inputs to AND gate 70. The operation of LCC 34 under various signal, DC and ground conditions is described later.

GFDC 36 comprises transistors M1 and M1s, resistance R2, comparator 74 and current source 76. DC power is provided to comparator 74 via lead 741 coupled to DCT 27 and lead 742 coupled to IGB 40. The drains of transistors M1, M1s are coupled to GT 28. The source of M1s is coupled to first signal input 743 of comparator 74 and output terminal 761 of current source 76, whose input terminal 762 is coupled to DCT 27. The source of M1 is coupled to IGB 40 and to second signal input 744 of comparator 74. As noted above, output 745 of comparator 74 is coupled to inverting or inverted input 704 of AND gate 70. The gates of transistors M1, M1s are coupled to a first terminal of resistance R2, whose second terminal is coupled to DCT 27. The operation of GFDC 36 under various signal, DC and ground conditions is described later.

OGSC 38 comprises diode D1, transistor M2 and resistance R4. A first terminal of diode D1 is coupled to IGB 40 and a second terminal of diode D1 is coupled to the drain of transistor M2. The source of transistor M2 is coupled to LT 29. The gate of transistor M2 is coupled via OG signal lead 41 to output 745 of comparator 74 and inverting input 704 of AND gate 70. Resistance R4 is coupled between the source and drain of transistor M2. The operation of OGSC 38 under various signal, DC and ground conditions is described later.

Under normal operating conditions (e.g., normal bus polarity and ground fault simulation switch 31 closed), transistors M1, M1s are ON by virtue of resistance R2 coupled to DCT 27. With transistor M1 ON, IGB 40 is close to the potential of external ground bus (EGB) 25 and so is input 744 of comparator 74. The potential of input 743 of comparator 74 is determined by the Rdson of transistor M1s times the current provided by current source 76 coupled to DCT 27. Under these circumstances output terminal 745 of comparator 74 coupled to input 704 of AND gate 70 is LOW. AND gate 70 of system 21 functions with positive logic with input 704 inverted (e.g., input 704 is HIGH when output 745 of comparator 74 is LOW and vice-versa). Thus, if the signal on external INPUT terminal 26 is also HIGH, then output terminal 705 of AND gate 70 (coupled to the gate of HSS 72 through GD 71) is also HIGH and HSS transistor 72 turns ON, thereby delivering power to LOAD 24 via link 30 and LT 29. Conversely, if the signal on external INPUT terminal 26 is LOW, output 745 of comparator 74 is still LOW so that input 704 of AND gate 70 is still HIGH, but with input 703 of AND gate 70 now LOW, then output 705 of AND gate 70 goes LOW, HSS transistor 72 turns OFF and power is no longer delivered from DCT 27 via HSS 72, link 30, and LT 29 to load 24. Since output terminal 745 of comparator 74 is still LOW, transistor M2 in OGSC 38 is OFF and therefore does not interfere with the normal operation of LCC 34 and HSS 72. Current 78 through transistor M2 is negligible under these circumstances.

If reverse DC conditions prevail (e.g., DC bus 23 negative), M1 and M1s are OFF, diode D1 of OGSC 38 is reverse biased and IGB 40 follows the voltage on DCB 23 toward negative voltage. A large current can flow through load 24 and HSS 72 and the voltage drop across the body diode of HSS 72 may become too high, creating too much power dissipation in HSS 72 and potentially damaging HSS 72. To avoid this outcome, HSS 72 is turned ON during the reverse DC condition. The current in HSS 72 during reverse DC condition is limited by load 24. By turning HSS 72 ON, the power dissipation in HSS 72 is reduced, thereby avoiding damage to HSS 72. The current otherwise flowing through the remainder of control and protection system 21 during reverse DC conditions is negligible.

If open ground conditions prevail (e.g., fault simulation switch 31 open) with M1 and M1s ON, the voltage on IGB 40 swings toward that of DCT 27 and direct current bus (DCB) 23. This voltage swing is detected by comparator 74 and the output of comparator 74 is coupled via OG signal lead 41 to the gate of M2 of OGSC 38, so that M2 of OGSC 38 turns ON. This has the effect of coupling IGB 40 to LT 29 and load 24 so that load 24 provides a synthetic ground connection for control and protection system 21 and load control circuit (LCC) 34 can continue to operate normally, e.g., turn HSS 72 ON when external INPUT 26 is HIGH and turn HSS 72 OFF when external INPUT 26 is LOW. Thus, the objectives of DC and load protection system 21 are met, except for the possible peripheral current problem described in connection with FIG. 1.

Under normal operating conditions (e.g., fault simulation switch 31 closed), current 77 flowing from resistance Req of peripheral circuits 39 is sunk to external ground bus (EGB) 25. Since transistor M1 is on, and current on IGB 40 can also be sunk to EGB 25. Under open ground conditions (e.g., ground fault simulation switch 31 open), the path illustrated by peripheral current 77 is interrupted and peripheral current 78 flows through IGB 40, diode D1 and the combination of resistor R4 and transistor M2 to LT 29 and via LOAD 24 to external ground bus (EGB) 25. If current 78 from peripheral circuits 39 becomes large enough, it may cause load 24 to respond under conditions where no response is desired. This is undesirable. Thus, it is desired to have a way for limiting peripheral current 78 under open ground fault conditions, without disturbing other operating modes of the protections system. This is accomplished by the embodiments illustrated in FIGS. 2 and 4.

Figure 4:
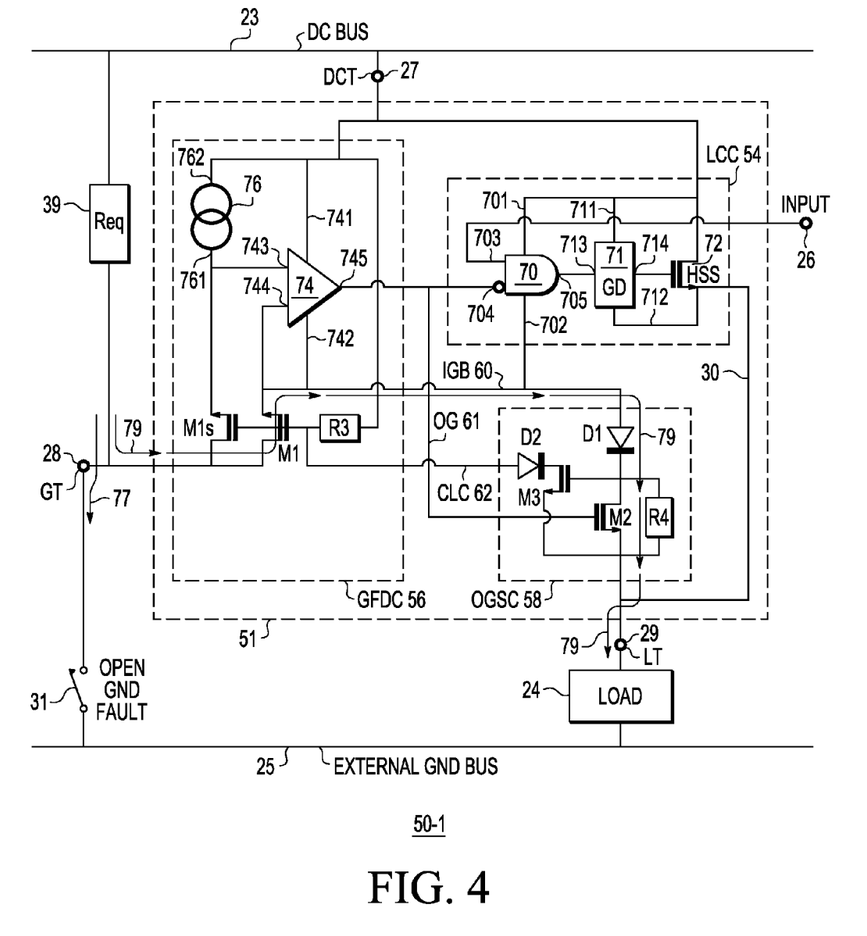
FIG. 4 is a simplified schematic of the load control and protection system of FIG. 2 illustrating further details according to a further embodiment of the present invention.

FIG. 4 shows simplified schematic 50-1 of load control and protection system 51 of FIG. 2, illustrating further details according to further embodiments of the present invention. The same reference numbers are used in FIG. 4 as in FIG. 2 for common elements and the discussion thereof in connection with FIG. 2 is incorporated herein by reference. Where similar elements are incorporated in FIG. 4 as in FIG. 3, the same reference numbers are used in both FIGS. 3 and 4 and the discussion in connection with FIG. 3 of such common elements is also incorporated herein by reference. The circuit details of LCC 54, GFDC 56 and OGSC 58 comprising control and protection system 51 are described below.

LCC 54 comprises AND gate 70, gate driver (GD) 71 and high side switch (HSS) transistor 72. DC power to AND gate 70 is provided by connection 701 to DCT 27 and connection 702 to internal ground bus (IGB) 40. Input 703 of AND gate 70 is coupled to external control signal INPUT terminal 26, where external ON/OFF signal commands are provided for the purpose of controlling the power delivered by system 51 to load 24 via lead 30. Input 704 of AND gate 70 is coupled to output 745 of comparator 74 of GFDC 56. The small circle at input 704 of AND gate 70 indicates that this input is inverted, that is, has a built-in or external input signal inverter so that a LOW output from comparator 74 becomes a HIGH input to AND gate 70 and vice versa. Output 705 of AND gate 70 is coupled to signal input 713 of gate driver (GD) 71. DC power to GD 71 is provided by terminal 711 coupled to DCT 27 and terminal 712 coupled to the source of HSS 72, which is in turn coupled via lead 30 to LT 29 and through LOAD 24 to EGB 25. Output 714 of GD 71 is coupled to the gate of HSS 72. GD 71 provides whatever signal level translation is needed to drive HSS 72 between OFF and ON states, depending upon the inputs to AND gate 70. For example and not intended to be limiting, when HSS 72 is an N channel power MOSFET, GD 71 may deliver gate drive to HSS 72 higher than the voltage of DC bus (DCB) 23 to insure that HSS 72 is fully ON in response to an ON signal at INPUT 26. The internal configuration of GD 71 will depend upon the choice of HSS 72 made by the designer and is therefore not shown herein. The present invention does not depend on the internal configuration of GD 71. The operation of LCC 54 under various signal, DC and ground conditions is described later.

GFDC 56 comprises transistors M1 and M1s, resistance R3, comparator 74 and current source 76. Resistance R3 is typically of the order of about 100 k Ohms, but larger and smaller resistances may also be used. DC power is provided to comparator 74 via lead 741 coupled to DCT 27 and lead 742 coupled to IGB 40. The drains of transistors M1, M1s are coupled to GT 28. The source of M1s is coupled to first signal input 743 of comparator 74 and output terminal 761 of current source 76, whose input terminal 762 is coupled to DCT 27. The source of M1 is coupled to IGB 60 and to second signal input 744 of comparator 74. As noted above, output 745 of comparator 74 is coupled to inverting or inverted input 704 of AND gate 70. The gates of transistors M1, M1s are coupled to a first terminal of resistance R3 whose second terminal is coupled to DCT 27. The operation of GFDC 36 under various signal, DC and ground conditions is described later.

OGSC 58 comprises diode D1, transistor M2, resistance R4, diode D2 and transistor M3. A first terminal of diode D1 is coupled to IGB 40 and a second terminal of diode D1 is coupled to the drain of transistor M2 and the gate of transistor M3. The source of transistor M2 is coupled to LT 29 along with lead 30 from LCC 54, and to the source of transistor M3. The gate of transistor M2 is coupled via OG signal lead 41 to output 745 of comparator 74 and inverting input 704 of AND gate 70. Resistance R4 is coupled between the source and drain of transistor M2, and therefore between gate and source of transistor M3. The drain of transistor M3 is coupled to a first terminal of diode D2 whose second terminal is coupled via CLC 62 to the gates of transistors M1, M1s and to the first terminal of resistor R3. System 51 of FIG. 4 and system 21 of FIG. 3 differ by the addition of transistor M3 and diode D2 in OGSC 58 of system 51 and current limiting connection (CLC) 62 described above. The operation of OGSC 58 under various signal, DC and ground conditions is described later.

Under normal operating conditions (e.g., normal bus polarity and ground fault simulation switch 31 closed), transistors M1, M1s are ON by virtue of resistance R3 coupled to DCT 27. With transistor M1 ON, IGB 60 is close to the potential of EGB 25 and so is input 744 of comparator 74. The potential of input 743 of comparator 74 is determined by the Rdson of transistor M1s times the current provided by current source 76 coupled to DCT 27. Under these circumstances output terminal 745 of comparator 74 coupled to input 704 of AND gate 70 is LOW. AND gate 70 of system 21 functions with positive logic with input 704 inverted (e.g., HIGH input relative to LOW output 745 of comparator 74 and vice-versa). When, for example, the signal on external INPUT terminal 26 is also HIGH (e.g., 5 volts or 2.5 volts or whatever logic signal level is being used to represent an ON input command), then output terminal 705 of AND gate 70 (coupled to the gate of HSS 72 through GD 71) is also HIGH and HSS transistor 72 turns ON, thereby delivering power to load 24 via link 30 and LT 29. Conversely, if the signal on external INPUT terminal 26 is LOW (e.g., 0 volts or GND or whatever logic signal level is being used to represent an OFF input command), output 745 of comparator 74 is still LOW so that input 704 of AND gate 70 is still HIGH, but with input 703 of AND gate 70 now LOW, then output 705 of AND gate 70 goes LOW, HSS transistor 72 turns OFF and power is no longer delivered from DCT 27 via HSS transistor 72, link 30, and LT 29 to LOAD 24. Since output terminal 745 of comparator 74 is still LOW, transistor M2 in OGSC 58 is OFF and therefore does not interfere with the normal operation of LCC 54 and HSS 72. The current through transistor M2 is negligible under these circumstances.

If reverse DC conditions prevail (e.g., DC bus 23 negative), M1 and M1s are OFF, diode D1 of OGSC 38 is reverse biased and IGB 60 follows the voltage on DCB 23 toward negative voltage. Diode D2 prevents reverse current flow via transistor M3 under reversed DC conditions. However, a large current can flow through load 24 and HSS 72 and the voltage drop across the body diode of HSS 72 may become too high, creating too much power dissipation in HSS 72 and potentially damaging HSS 72. To avoid this outcome, HSS 72 is turned ON during the reverse DC condition. The current in HSS 72 during reverse DC condition is limited by load 24. By turning HSS 72 ON, the power dissipation in HSS 72 is reduced, thereby avoiding damage to HSS 72. The current otherwise flowing through the remainder of protection system 21 during reverse DC conditions is negligible.

If open ground conditions prevail (e.g., fault simulation switch 31 open) with M1 and M1s ON, the voltage on IGB 60 swings toward that of DCT 27 and DCB 23. This voltage swing is detected by comparator 74 and the output of comparator 74 is coupled via OG signal lead 61 to the gate of M2 of OGSC 58, so that M2 of OGSC 58 turns ON. This has the effect of coupling IGB 60 to LT 29 and via LOAD 24 to EGB 25 so that LOAD 24 provides a synthetic ground connection for control and protection system 51 and load control circuit (LCC) 54 can continue to operate substantially normally, e.g., turn on HSS 72 when external INPUT 26 is HIGH and turn off HSS 72 when external INPUT 26 is LOW. Thus, the objectives of DC and load protection system 51 are met. The manner in which system 51 of the embodiment of FIG. 4 also avoids the excess peripheral current problem noted in connection with FIGS. 1 and 3 is described below.

Referring again to FIG. 4, during normal operation (e.g., DC bus 23 positive; ground fault simulation switch 31 closed), OGSC 58 functions in substantially the same manner as already described for OGSC 38 of FIG. 3 and summarized above. If HSS 72 is ON in response to an ON signal presented at INPUT 26, LT 29 is connected to DCT 27 via HSS 72 and lead 30, and power is delivered via LT 29 to LOAD 24. Diodes D2 and D1 are in reverse bias and transistors M1, M1s are ON. Since switch 31 is presumed closed, peripheral current 77 is being harmlessly sunk to external ground bus (EGB) 25 via GT 28. If HSS 72 is OFF in response to an OFF signal at INPUT 26, then LT 29 is substantially at the potential of EGB 25 (e.g., ~0 volts) because of the generally low impedance of LOAD 24. GT 28 is also substantially at the potential of EGB 25 since switch 31 is still presumed closed. So M2 and M3 are off and no current flows in R3. Under these circumstances R3 has no drop voltage and pulls up the gate of M1 to turn M1 fully ON so that IGB 60 is also close to the potential of EGB 25.

During an open ground condition (ground fault simulation switch 31 open), as has already been explained, M2 is ON to couple IGB 60 to LT 29 through diode D1 and via LOAD 24 to EGB 25. In this manner, IGB 60 remains close to the potential of EGB 25 even if the direct connection between GT 28 and EGB 25 is lost (e.g., ground fault simulation switch 31 open). Peripheral current 79 is diverted from GT 28 to IGB 60 and OGSC 58, wherein it passes through diode D1 and the parallel combination of transistor M2 and resistance R4 of OGSC 58. The voltage drop created by peripheral current 79 passing through the resistance presented by the parallel combination of transistor M2 and resistance R4 (expressed as $Rdson_{m2}//R4$) biases the gate of transistor M3, that is $Vg_{M3}=I_{79}*(Rdson_{M2}//R4)$. M3 becomes conductive and current now flows from DCT 27 through resistance R3 to LT 29 and via LOAD 24 to EGB 25. The voltage drop across resistance R3 causes M1 to work as a source-follower where the source-drain voltage across M1 follows the gate voltage of M1, now determined by the current flowing from DCT 27 through R3, CLC 62, diode D2, transistor M3, LT 29, and LOAD 24 to EGB 25. Because of peripheral circuits 39 having equivalent resistance Req coupled between DC bus (DCB) 23 and GT 28, the potential of GT 28 can now rise closer to DC bus 23 even though IGB 60 remains substantially coupled to EGB 25 via transistor M2 of OGSC 58. As the potential of GT 28 rises, peripheral current 79 decreases or stated another way, the maximum value of peripheral current 79 that is diverted (when fault simulation switch 31 is open) via GT 28, GFDC circuit 56, IGB 60 and OGSC 58 to LT 29 to flow through LOAD 24 to EGB 25 is limited. Stated still another way, coupling the drain of M2 (e.g., via M3 and CLC 62) to the juncture of the gate of M1 and R3 of GFDC 56 establishes a new current path from R3 to EGB 25 (e.g., via CLC 62, D2, M3, LT 29, and LOAD 24) and reduces the gate drive on M1. The gate drive on M1 is reduced approximately in direct proportion to this additional current flowing through R3 from DCT 27 to EGB 25. This causes M1 to no longer be fully ON. In effect, the resistance of M1 is increased by current limiting feedback connection (CLC) 62. This limits the magnitude of peripheral current 79 that can flow from resistance Req via IGB 60, D1, M2 and LT 29 through LOAD 24 under open ground fault conditions. Because R3 is generally large relative to the impedance of LOAD 24, and because of the gain provided by transistor M1, the incremental current flowing between DCB 27 and EGB 25 via CLC 62 when M3 is ON is generally negligible compared to peripheral current 79. Accordingly, because current 79 is actively limited by transistor M1 in response to the connection provided via CLC 62, the excess peripheral current condition described in connection with FIGS. 1 and 3 of prior art control and protection system 21 is avoided. This is a significant advance in the art.

Figure 5:
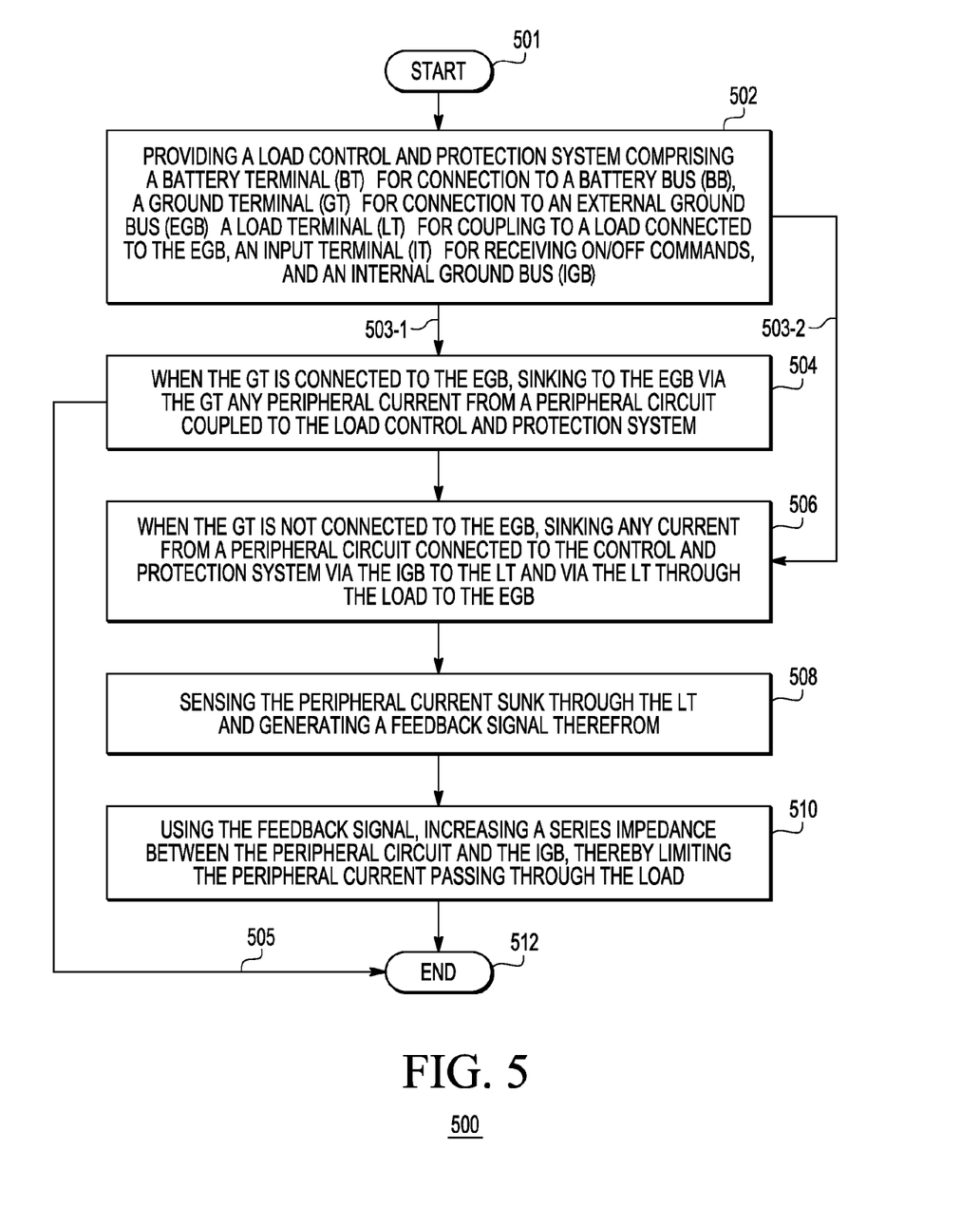
FIG. 5 is a simplified block diagram of a method for limiting peripheral current originating from one or more peripheral circuits coupled to the load control and protection system, according to still additional embodiments of the invention.

FIG. 5 is a simplified block diagram of method 500 for limiting current 79 originating from one or more peripheral circuits 39 coupled to load control and protection system 51, for example, via GT 28, according to still additional embodiments of the invention. Method 500 begins with START 501 and initial step 502 wherein there is provided a control and protection system (51) comprising a direct current terminal (DCT) (27) for connection to a direct current bus (DCB) (23), a ground terminal (GT) (28) for connection to an external ground bus (EGB) (25), a load terminal (LT) (29) for coupling to a LOAD (24) connected to the EGB (25), an INPUT terminal (26) for receiving ON/OFF commands, and an internal ground bus (IGB) (60). According to path 503-1, one embodiment of method 500 proceeds to step 504 wherein when the GT (28) is connected to the EGB (25), method 500 comprises sinking to the EGB (25) via the GT (28) any current (77) from a peripheral circuit (39) coupled to the load control and protection system (51) and thence via path 505 to END 512. According to path 503-2, when the GT (28) is not connected to the EGB (25), another embodiment of method 500 proceeds to steps 506, 508 and 510 and thence to END 512. In step 506, method 500 comprises sinking any current (79) from a peripheral circuit (39) connected to the load control and protection system (51) via the IGB (60) to the LT (29), and via the LT (29) through the LOAD (24) to the EGB (25). In step 508, the peripheral current (79) being sunk through the LT (29) is sensed and a feedback signal generated therefrom, e.g., by the source-drain drop across transistor M2. In step 510, the feedback signal is used (e.g. via transistor M3, CLC 62 and resistance R3) to increase a series impedance (e.g., provided by the source-drain impedance of transistor M1) between the peripheral circuit (39) and the IGB (60), thereby limiting the peripheral current (79) passing through the load (24). This embodiment of method 500 then proceeds to END 512. Stated another way, the peripheral current (79) being sunk through the LT (29) is sensed (e.g., in M2), the result amplified (e.g., in M3) and fed back (e.g., via CLC 62) to decrease the coupling between a peripheral circuit (39 represented by resistance Req) and the IGB (60) so that the current (79) from the peripheral circuit(s) (39) flowing to the LOAD (24) is limited.

According to a first embodiment, there is provided a load control and protection system (51) having a DC terminal (DCT) (27) adapted to be coupled to a DC bus (DCB) (23), a load terminal (LT) (29) adapted to be coupled to a LOAD (24), a ground terminal (GT) (28) adapted to be coupled to an external ground bus (EGB) (25), wherein the GT (28) is also adapted to be coupled to a peripheral circuit (39), and comprising, a ground fault detection circuit (GFDC) (56) coupled to the GT (28) and the DCT (27), an open ground switch circuit (OGSC) (58) coupled to the LT (29), an internal ground bus (IGB) (60) coupled between the GFDC (56) and the OGSC (58), an open ground (OG) signal lead (61) coupled between at least the GFDC (56) and the OGSC (58), and a current limiting connection (CLC) (62) coupled between the OGSC (58) and the GFDC (56), wherein the GFDC (56) is adapted to place an open ground signal on the OG signal lead (61) when a connection between the GT (28) and the EGB (25) is not present, and wherein the OGSC (58) is adapted when in receipt of the open ground signal on the OG signal lead (61) to couple the IGB (60) to the LT (29), sense a current (79) flowing from the GT (28) to the LT (29) via the IGB (60) and energize the CLC (62) between the GFDC (56) and the LT (29) to limit the current (79) flowing from the GT (28) through the control and protection system (51) to the LT (29). According to a further embodiment, the GFDC (56) comprises a first transistor (M1) having a first principal terminal coupled to the GT (28, and a second principal terminal coupled to the IGB (60), and a control terminal coupled to the CLC (62), and wherein the current (79) from the GT (28) flows through the first transistor (M1) to the IGB (60). According to a still further embodiment, the OGSC (58) comprises a second transistor (M2) having a first principal terminal coupled to the IGB (60) and a second principal terminal coupled to the LT (29) and a control terminal coupled to the OG signal lead (61) and adapted to turn ON when receiving the open ground signal on the OG signal lead (61). According to a yet further embodiment, the OGSC (58) further comprises a first diode (D1) coupled between the first principal terminal of the second transistor (M2) and the IGB (60). According to a still yet further embodiment, the GFDC (56) further comprises a resistance (R3) coupled between the DCT (27) and the control terminal of the first transistor (M1). According to a yet still further embodiment, the OGSC (58) still further comprises a third transistor (M3) having a first principal terminal coupled to the CLC (62) and a second principal terminal coupled to the LT (29) and a control terminal coupled to the first principal terminal of the second transistor (M2), so that when the current (79) from the GT (28) flows through the second transistor (M2) a voltage drop created thereby is communicated via the third transistor (M3) and the CLC (62) to the control terminal of the first transistor (M1) to limit the current (79) flowing from the GT (28) through the first transistor (M1) to the IGB (60). According to another embodiment, the OGSC (58) yet further comprises a second diode (D2) coupled between the first principal terminal of the third transistor (M3) and the CLC (62). According to a still another embodiment, the third transistor (M3) whose first principal terminal is coupled via the CLC (62) to the control terminal of the first transistor (M1) and the resistance (R3), when energized causes the first transistor (M1) to function as a follower, limiting the current flowing from the GT (28) via the IGB (60) and the second transistor (M2) to the LT (29). According to a yet another embodiment, an increase in a current passing through the resistance (R3) decreases a drive on the control terminal of the first transistor (M1) thereby limiting the current (79) flowing there through from the GT (28) to the IGB (60). According to a still yet another embodiment, the system further comprises a load control circuit (LCC) (54) having an INPUT terminal (26) and coupled to the DCT (27) and the LT (29), and adapted to provide power to the LT (29) from the DCT (27) in response to an ON signal at the INPUT terminal (26). According to a yet still anotehr embodiment, the system (51) is adapted when the GT (28) is coupled to the EGB (25) to pass a current (77) arriving at the GT (28) from a peripheral circuit (39) coupled to the GT (28) to the EGB (25) via the GT (28).

According to a second embodiment, there is provided a method of operating a load control and protection system (51) having a direct current (DC) terminal (DCT) (27) adapted to be coupled to a DC bus (DCB) (23), a load terminal (LT) (29) adapted to be coupled to a LOAD (24), a ground terminal (GT) (28) adapted to be coupled to an external ground bus (EGB) (25) and to a peripheral circuit (39), and an internal ground bus (IGB) (60) adapted to be coupled between the GT (28) and the LT (29) to sink current (79) from the peripheral circuit (39) arriving at the GT (28) without adversely affecting the LOAD (24), comprising, turning on a first active device (M1) within the system (51) to couple the GT (28) to the IGB (60), detecting when a connection between the GT (28) and the EGB (25) is interrupted, turning on a second active device (M2) within the system (51) to couple the IGB (60) to the LT (29), using the first active device (M1) and the second active device (M2), routing peripheral current (79) from the peripheral circuit (39) over the IGB (60) to the LT (29), using the second active device (M2), creating a feedback signal related to the peripheral current (79) passing through the LT (29), and using the feedback signal, limiting the peripheral current (79) being coupled to the IGB (60) via the first active device (M1). According to a further embodiment, when connection between the GT (28) and the EGB (25) is not interrupted, sinking the peripheral current (77) to the EGB (25) via the GT (28). According to a still further embodiment, the step of limiting the peripheral current (79) comprises, applying the feedback signal to a control terminal of a third active device (M3) whose principal terminals are coupled between a control terminal of the first active device (M1) and the LT (29). According to a yet further embodiment, the routing step further comprises using the third active device (M3) to reduce a drive potential on the control terminal of the first active device (M1) thereby increasing its impedance to the peripheral current (79) passing there through. According to a still yet further embodiment, the step of reducing the drive potential on the control terminal of the first active device comprises using the second active device to increase current flowing through a resistance (R3) coupled between the control terminal of the first active device (M1) and the DCT (27).

According to a third embodiment, there is provided a method (500) for using a load control and protection system (51), having a DC terminal (DCT) (27) for connection to a DC bus (DCB) (23), a ground terminal (GT) (28) for connection to an external ground bus (EGB) (25), a load terminal (LT) (29) for coupling to a LOAD (24) connected to the EGB (25), and an internal ground bus (IGB) (60), the method comprising during operation of the load control and protection system (51), when the GT (28) is connected to the EGB (25), sinking to the EGB (25) via the GT (28) any current (77) from a peripheral circuit (39) coupled to the control and protection system (51), when the GT (28) is not connected to the EGB (25), sinking any current (79) from a peripheral circuit (39) connected to the control and protection system (51) via the IGB (60) to the LT (29), and via the LT (29) through the LOAD (24) to the EGB (25), and sensing the current (79) sunk through the LT (29), generating a feedback signal therefrom, using the feedback signal, increasing a series impedance (M1) between the peripheral circuit (39) and the IGB (60) thereby limiting the peripheral current (79) passing through the load (24). According to a further embodiment, the series impedance comprises a first transistor (M1) having a first control terminal receiving a potential derived from the feedback signal. According to a still further embodiment, the sensing step comprises passing the peripheral current (79) through a second transistor (M2) and the feedback signal is proportional to a potential drop across an output of the second transistor (M2). According to a yet further embodiment, the sensing step further comprises coupling the output of the second transistor (M2) to an input of a third transistor (M3) whose output is coupled to the input of the first transistor (M1).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described and methods of preparation in an exemplary embodiment without departing from the scope of the invention as set forth in the appended claims and their legal equivalents.

What is claimed is:

1. A load control and protection system having a DC terminal (DCT) adapted to be coupled to a DC bus (DCB), a load terminal (LT) adapted to be coupled to a LOAD, a ground terminal (GT) adapted to be coupled to an external ground bus (EGB), wherein the GT is also adapted to be coupled to a peripheral circuit, and comprising:
a ground fault detection circuit (GFDC) coupled to the GT and the DCT;
an open ground switch circuit (OGSC) coupled to the LT;
an internal ground bus (IGB) coupled between the GFDC and the OGSC;
an open ground (OG) signal lead coupled between at least the GFDC and the OGSC; and
a current limiting connection (CLC) coupled between the OGSC and the GFDC;
wherein the GFDC is adapted to place an open ground signal on the OG signal lead when a connection between the GT and the EGB is not present;
wherein the OGSC is adapted when in receipt of the open ground signal on the OG signal lead to couple the IGB to the LT, sense a current flowing from the GT to the LT via the IGB and energize the CLC between the GFDC and the LT to limit the current flowing from the GT through the control and protection system to the LT; and
wherein the GFDC comprises a first transistor (M1) having a first principal terminal coupled to the GT, and a second principal terminal coupled to the IGB, and a control terminal coupled to the CLC, and wherein the current from the GT flows through the first transistor (M1) to the IGB.

2. The system of claim 1, wherein the OGSC comprises a second transistor (M2) having a first principal terminal coupled to the IGB and a second principal terminal coupled to the LT and a control terminal coupled to the OG signal lead and adapted to turn ON when receiving the open ground signal on the OG signal lead.

3. The system of claim 2, wherein the OGSC further comprises a first diode (D1) coupled between the first principal terminal of the second transistor (M2) and the IGB.

4. The system of claim 2, wherein the GFDC further comprises a resistance (R3) coupled between the DCT and the control terminal of the first transistor (M1).

5. The system of claim 4, wherein the OGSC still further comprises a third transistor (M3) having a first principal terminal coupled to the CLC and a second principal terminal coupled to the LT and a control terminal coupled to the first principal terminal of the second transistor (M2), so that when the current from the GT flows through the second transistor (M2) a voltage drop created thereby is communicated via the third transistor (M3) and the CLC to the control terminal of the first transistor (M1) to limit the current flowing from the GT through the first transistor (M1) to the IGB.

6. The system of claim 4, wherein the OGSC yet further comprises a second diode (D2) coupled between the first principal terminal of the third transistor (M3) and the CLC.

7. The system of claim 5, wherein the third transistor (M3) whose first principal terminal is coupled via the CLC to the control terminal of the first transistor (M1) and the resistance (R3), when energized causes the first transistor (M1) to function as a follower, limiting the current flowing from the GT via the IGB and the second transistor (M2) to the LT.

8. The system of claim 6, wherein an increase in a current passing through the resistance (R3) decreases a drive on the control terminal of the first transistor (M1) thereby limiting the current flowing there through from the GT to the IGB.

9. The system of claim 1, further comprising a load control circuit (LCC) having an INPUT terminal and coupled to the DCT and the LT, and adapted to provide power to the LT from the DCT.

10. The system of claim 1, wherein the system is adapted when the GT is coupled to the EGB to pass a current arriving at the GT from a peripheral circuit coupled to the GT to the EGB via the GT.

11. A method of operating a load control and protection system having a direct current terminal (DCT) adapted to be coupled to a DC bus (DCB), a load terminal (LT) adapted to be coupled to a LOAD, a ground terminal (GT) adapted to be coupled to an external ground bus (EGB) and to a peripheral circuit, and an internal ground bus (IGB) adapted to be coupled between the GT and the LT to sink current from the peripheral circuit arriving at the GT without adversely affecting the LOAD, comprising:
- turning on a first active device (M1) within the system to couple the GT to the IGB;
- detecting when a connection between the GT and the EGB is interrupted;
- turning on a second active device (M2) within the system to couple the IGB to the LT;
- using the first active device (M1) and the second active device (M2), routing peripheral current from the peripheral circuit over the IGB to the LT;
- using the second active device (M2), creating a feedback signal related to the peripheral current passing through the LT; and
- applying the feedback signal to a control terminal of a third active device (M3) whose principal terminals are coupled between a control terminal of the first active device (M1) and the LT to limit the peripheral current being coupled to the IGB via the first active device (M1).

12. The method of claim 11, wherein when connection between the GT and the EGB is not interrupted, sinking the peripheral current to the EGB via the GT.

13. The method of claim 11, wherein the routing step further comprises using the third active device (M3) to reduce a drive potential on the control terminal of the first active device (M1) thereby increasing its impedance to the peripheral current passing there through.

14. The method of claim 13, wherein the step of reducing the drive potential on the control terminal of the first active device comprises using the second active device to increase current flowing through a resistance (R3) coupled between the control terminal of the first active device (M1) and the DCT.

15. A method for using a load control and protection system, having a DC terminal (DCT) for connection to a DC bus (DCB), a ground terminal (GT) for connection to an external ground bus (EGB), a load terminal (LT) for coupling to a LOAD connected to the EGB, and an internal ground bus (IGB), the method comprising during operation of the load control and protection system:
- when the GT is connected to the EGB, sinking to the EGB via the GT any current from a peripheral circuit coupled to the control and protection system;
- when the GT is not connected to the EGB, sinking any current from a peripheral circuit connected to the control and protection system via the IGB to the LT, and via the LT through the LOAD to the EGB;
- sensing the current sunk through the LT;
- generating a feedback signal therefrom; and
- using the feedback signal, increasing a series impedance (M1) between the peripheral circuit and the IGB thereby limiting the peripheral current passing through the load, the series impedance comprising a first transistor (M1) having a first control terminal receiving a potential derived from the feedback signal.

16. The method of claim 15, wherein the sensing step comprises passing the peripheral current through a second transistor (M2) and the feedback signal is proportional to a potential drop across an output of the second transistor (M2).

17. The method of claim 16, wherein the sensing step further comprises coupling the output of the second transistor (M2) to an input of a third transistor (M3) whose output is coupled to the input of the first transistor (M1).

* * * * *